C. T. PFLUEGER ET AL

Aug. 23, 1932.

SALT WATER REEL

Re. 18,580

2 Sheets-Sheet 1

Original Filed July 30, 1927

INVENTORS
Charles T. Pflueger
Walter L. Adams
BY Elgin Barrow
ATTORNEYS.

C. T. PFLUEGER ET AL

Aug. 23, 1932.

SALT WATER REEL

Re. 18,580

2 Sheets-Sheet 2

Original Filed July 30, 1927

INVENTORS.
Charles T. Pflueger
Walter L. Adams
By Elgy Barrow
ATTORNEYS.

Reissued Aug. 23, 1932 Re. 18,580

UNITED STATES PATENT OFFICE

CHARLES T. PFLUEGER AND WALTER L. ADAMS, OF AKRON, OHIO, ASSIGNORS TO THE ENTERPRISE MANUFACTURING COMPANY, OF AKRON, OHIO, A CORPORATION OF OHIO

SALT WATER REEL

Original No. 1,832,421, dated November 17, 1931, Serial No. 209,493, filed July 30, 1927. Application for reissue filed January 18, 1932. Serial No. 587,422.

This invention relates to fishing reels and particularly to that type of reel which is adapted for salt water fishing, having the several features which adapt the reel for this type of fishing together with additional features and combinations as will be set out more fully herein.

The objects of the invention are to improve upon reels of this type by the provision of adjustable brake mechanism under the control of the fisherman at all times, together with adjustable drag mechanism and free spool devices, so that the reel may be used with greater facility and efficiency in the catching of large salt water fish. It is also an object of the invention to construct a new form of brake mechanism by which a more powerful braking action than obtainable in prior reel structures may be applied to the spool and to combine this with a click mechanism of an improved type.

Other objects of the invention are to improve upon details of the drag mechanism, and the construction of the end plates of the reel. Other objects are to construct a compact, easily operated reel which is particularly adapted for the very heavy strain and pressures which are encountered in deep sea fishing.

The drawings show the preferred form of the invention in detail, it being understood that the features of the invention may be employed in other specific reel constructions without departing from the scope of the invention as set forth in the claims appended hereto.

In the drawings:—

Figure 5:
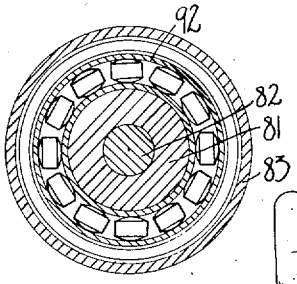
Figure 5 is a section on the line 5—5 of Figure 1.

The reel comprises two end plates, a front plat 1 and a back plate 2, connected by pillars 3 and a foot plate 4 which is usually formed as a single casting with a reel seat 5 by which the reel is attached to the rod, the foot plate being a heavier construction than the pillars. The plates and connected parts form the reel housing.

The front plate 1 is of somewhat heavier construction than the back plate as it forms a housing for the gears and spool driving mechanism. Each of the plates comprises a composition or hard rubber face 6 having a recessed metal backing plate 7 on its inner surface. This metal plate is stamped out of comparatively heavy sheet metal, the edges of the plates being faced with a lighter metal ring 8 angular in cross section and fitting over the edge of the plate 7 and around the edges of the rubber backing plate. The reason for constructing the end plates in the manner described is to obtain a sharp edge which will closely fit the spool flanges 10, thus preventing catching of the line between the edges of the spool flanges and the adjacent rim of the metal plate. It is impracticable to stamp heavy metal such as should be employed in the backing plates with sharp corners to make a close fit with the spool flanges. By the employment of the light metal rings on the edges of the back plate, a close fit may be secured as the metal can be cut accurately to fit the spool flanges. These rings are held in place by extensions of the pillars and foot plate which enter recesses in the ring flanges.

The spool is designated by the numeral 12, being made in two sections 13 fitted over the spool shaft or spindle 16. The outer ends of the sections are each formed with a heavy flange 17 against which the spool flange 10 is seated, the metal of the spool section being spun or pressed about the inner edges of the spool flange, as shown at 18. It is usual, in forming spools, to apply the spool flanges to the outside of the spool and spin the metal over the outer surfaces of the spool flanges. This construction, however, affords a very weak support for the spool flanges and with the excessively severe strains imposed upon the spool flange in the reeling-in of large fish, the spun-over flanges of the prior construction will often give way. By the formation of the heavy outer flanges 17, however, the spool flanges are adequately reinforced and backed up against the strain exerted upon them.

In order to assemble the spool and spool flanges, it is necessary to divide the main body of the spool in the two sections as has been described. The spool sections are assembled by passing them over the shaft 16 and by providing the inner end of each spool section with a screw-threaded recess 20, which engages a screw-threaded sleeve or nipple 21 at the center of the spool. When the spool sections have been assembled in the manner described, the sections are fastened to the shaft by means of riveted transverse pins 22 and 23, one of which may be in tubular form so as to provide anchorage for the end of the line. When the spool sections are brought together, a very close fit is provided so that the line of separation is practically invisible. In order to obtain this result, the inner ends of the spool sections may be concaved or counter-sunk, as indicated at 24, so that an edge contact is assured. The degree of countersinking is very slight, the showing in the drawing being exaggerated for the purpose of making it clear.

The shaft 16 is mounted in a bushing 30 in the back plate, which is surmounted by a screw-threaded thrust bearing 31 surrounded by tension cup 32. On the front plate, the shaft is mounted in a bushing 33 surmounted by a thrust bearing 34. Between the head of the thrust bearing and the front plate is located the rotatable oiling ring 35 which is provided with an oil hole 36, adapted to be brought into register with a similar hole 37 in the thrust bearing, through which oil may be admitted to the thrust bearing and adjacent parts.

The bushing 33 is provided with an annular recess 39 and with an inwardly extending flange 40 which extends to the inner surface of the backing plate, being secured in position by means of the flange 42. Rotatable upon the end of the shaft 16 is a spool driving pinion 45 which is seated in the recess in the bushing, being confined therein by the flange 40 and by the mechanism to be later described. The pinion is driven by an intermeshing driving gear 46 mounted at one side of the reel housing, the flange of the bushing being cut away to permit such engagement of the gear and pinion. The pinion 45 is in non-rotative, but sliding engagement with a shiftable clutch 48, preferably by mounting the latter upon an integral squared shank 50 formed as an extension of the pinion.

The clutch element 48 is formed with a plurality, preferably two, of integral pins 51, one side of each pin being beveled, these pins being cut from the metal of the clutch member and thereby affording greater strength and more compactness than would be afforded by riveting pins in place on the clutch or spool. The end of the spool adjacent the clutch is provided with a recess 52 in which is seated a disk 53 having a plurality of holes therein in which the pins 51 are adapted to engage when the clutch is moved toward the spool. The disk 53 is held in place by spinning the metal of the spool over the disk, as indicated at 55, and by dowels or pins.

The clutch is moved toward and from the spool to make or break driving connection between the spool and pinion by means of a lever 58, having forked ends 59 which engage a groove 60 formed in the clutch member. The lever 58 is provided with parallel lugs or ears 62 which are received between the lugs 63 stamped upwardly from the metal of the plate 7, a pivot 64 being passed through the lugs upon which the lever may be rocked. A coil spring 65 is wrapped about the pivot, one end bearing against the under side of the lever and the other end against the front plate so that the tendency of the spring is to move the clutch into engagement with the spool. The end of the lever remote from the clutch is formed with a downwardly turned hook-shaped formation 66 which is held by the spring in contact with a rotary cam button 68 having a transverse groove 69 and flat lands or elevated surfaces 70. This construction of the cam button assures a positive holding of the lever in its extreme positions of adjustment and the flat surfaces and the groove will retain the lever in a position of rest at either limit of movement of the cam button, and when the cam button is moved to bring the clutch into engagement with the spool, the inclined walls of the groove will cause the button to snap into position under the force of the coil spring. The cam button stem 72 extends through the front plate and is squared at its outer extremity where it is held within a plate 73 by a screw 74. An operating arm 75 extends from the plate 73 and overhangs the edge of the front plate in convenient position for manipulation by the fisherman. It will be noted that when the reel is taken apart, the pinion 45 and the clutch 48 cannot be lost, being confined within the flange on the bushing 33 by the clutch operating lever.

Figure 1:
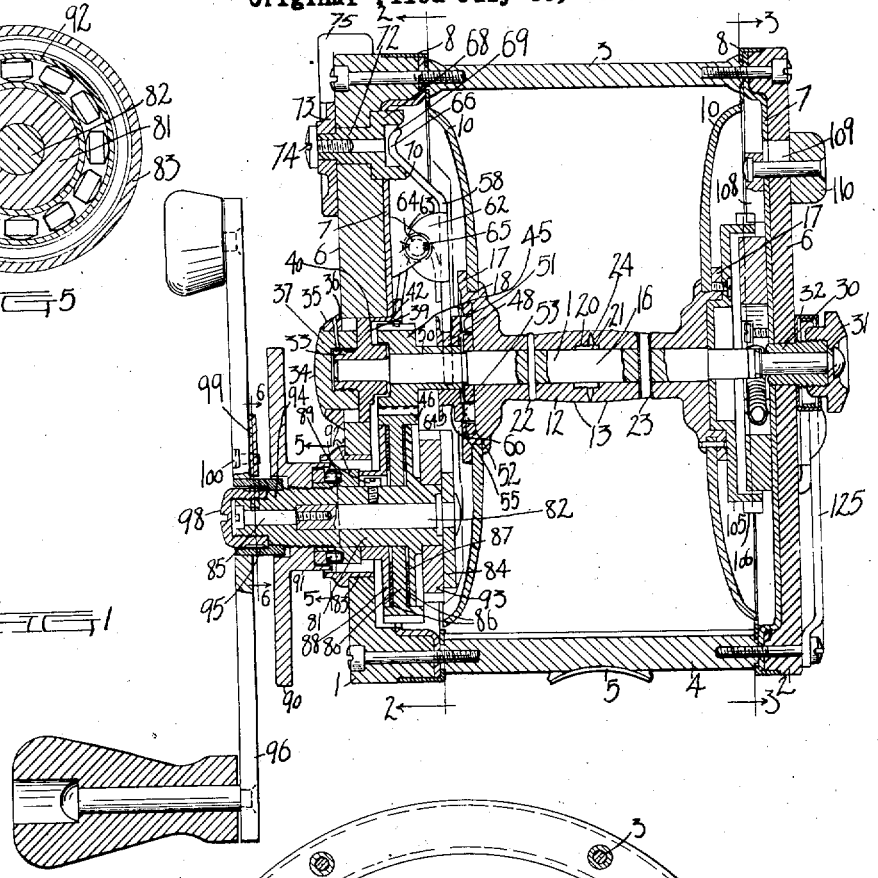
Figure 1 is longitudinal section through the complete reel structure.
Figure 2:
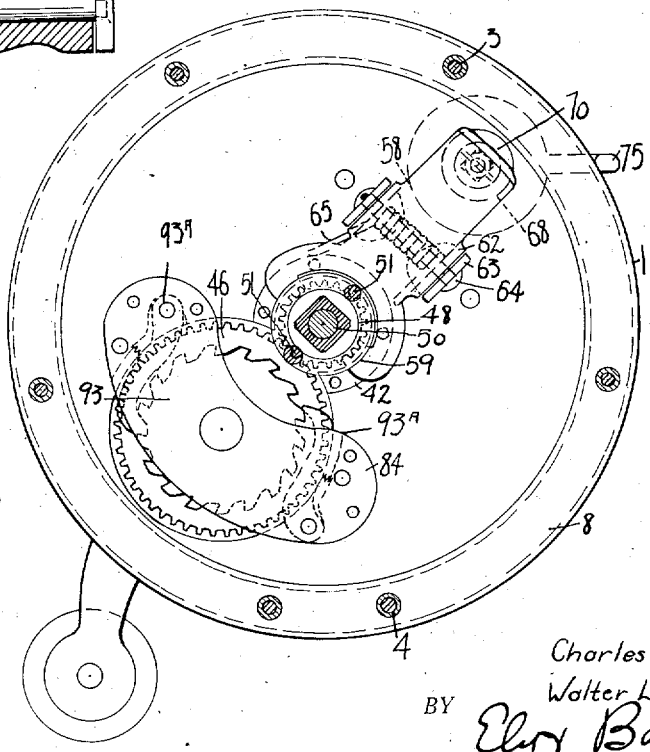
Figure 2 is a section on the line 2—2 of Figure 1.
Figure 6:
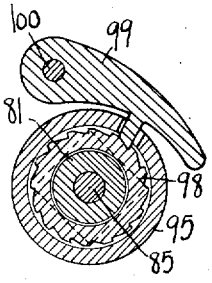
Figure 6 is a section on the line 6—6 of Figure 1.
Figure 7:
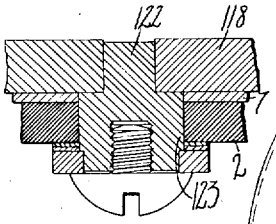
Figure 7 is an enlarged section on the line 7—7 of Figure 3.

The spool is driven through the gear 46 which has previously been referred to. The central or body portion of the gear is formed as a disk 80 rotatable upon the main driving shaft 81 which is journaled upon a post 82 and held thereon by a pin 85 and is passed through the center of a sleeve 83 secured upon the front plate. The post is secured in position by attachment to a bridge piece 84 fastened to the inner face of the front plate, but slightly elevated therefrom. Adjustable frictional driving force is transmitted to the gear 46 by means of friction disks 86 at either side of the disk 80, one of these disks being supported by a flange 87 formed as a part of the shaft 81 and the other by a sliding disk 88 non-rotatively connected to the shaft 81 by a set screw 89 received in a slot in the disk. Pressure is exerted upon the driving members for the gear 46 by an adjustable star wheel 90 having screw-threaded engagement with the outer end of the shaft 81. A roller bearing cage 92 is interposed between the star wheel and the outer disk 88, being telescoped with the star wheel by means of an inwardly projecting flange 91 on the star wheel. This cage is inseparably connected together, as shown in Figure 1, so that when the reel is taken apart for cleaning and oiling the roller bearing will remain intact. When the drag mechanism operates upon the unreeling of the line, the clutch being engaged, the shaft 81 is held from rotation in reverse direction by a ratchet 93 secured to the shaft and engaged by a pawl or pawls 93[a] on the bridge plate 84. Near the outer end of the shaft 81 is provided a squared portion 94 over which is received the hub 95 of an operating crank handle 96. The hub is formed as a separate bushing, having a permanent, non-rotative connection with the crank. The outer end of the shaft is reduced and screw-threaded and in a recess in the crank handle is seated a cap nut 98 which holds the crank handle in place upon the shaft. It will be observed that the hub of the crank handle is recessed to receive the cap nut so that its rounded outer surface is substantially flush with the surface of the crank. By this arrangement, no possibility of injury to the fisherman can arise due to striking a large or sharp projection at the hub of the nut 98 handle. In order to secure the crank in position and prevent it from working loose, the outer surface thereof is provided with ratchet teeth which are engaged by a pivoted dog 99 projecting through an opening in the crank and held in position by a set screw 100 on the handle crank.

In addition to the adjustable drag which may be exerted upon the spool through the driving mechanism which has been described, the reel also provides for a more powerful braking action exerted through mechanism mounted on the back plate.

To the end of the spool adjacent the back plate is fastened a brake drum 105, the inner surface or wall of the drum providing the braking surface for the spool. The outer surface of the brake drum is formed with a plurality of rounded teeth 106, with which are adapted to be engaged by the adjustable click pawl 108 mounted in a radial slot 109 on the back plate by means of a pin and button 110. The pawl is yieldingly held in proper radial position by means of two oppositely positioned wire click springs 112 which lie against the back plate, being held in position by clips 113. The ends of the wires bearing against the pawl are bent upwardly, as shown at 114, while the other ends are bent downwardly and received in holes 115 on the back plate.

Figure 3:
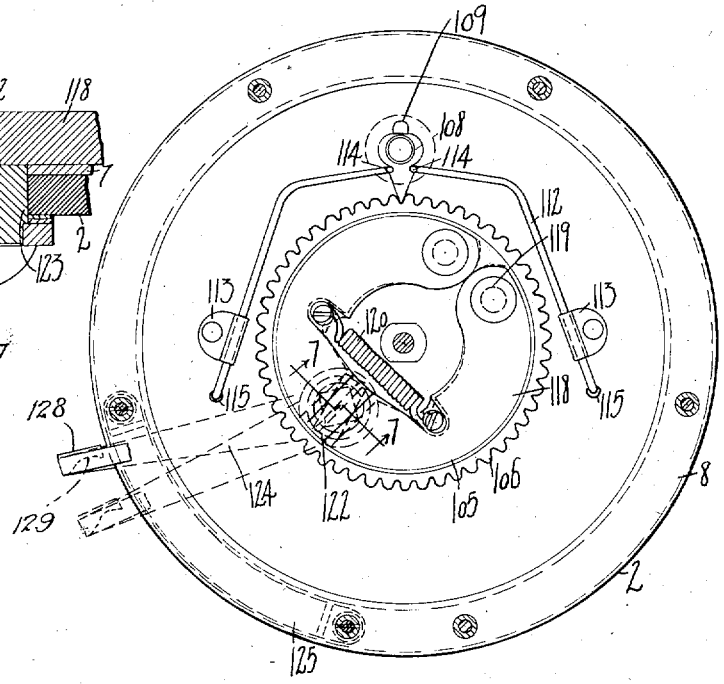
Figure 3 is a section on the line 3—3 of Figure 1.
Figure 4:
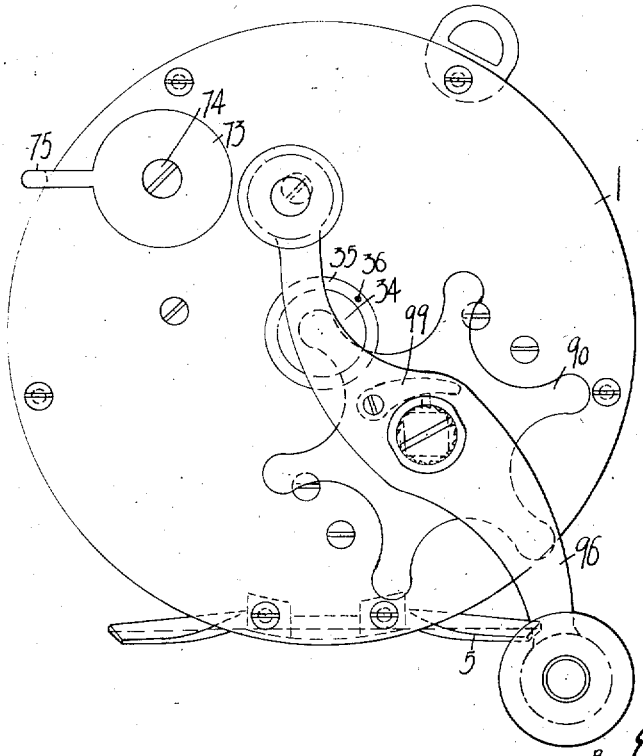
Figure 4 is a side elevation looking at the front plate of the reel.

The braking action is secured by means of two arc-shaped brake shoes 118 which are pivoted to the back plate at 119. The brake shoes are each made of a single piece of "bakelite" or similar material. The free ends of the brake shoes are forced together by means of a coil spring 120 which keeps the shoes out of contact with the flange of the brake drum. The ends of the shoes bear against a flat button 122 formed on a rounded hub 123 rotatably mounted in the back plate. The outer end of the button is squared and to this squared end is secured an operating lever 124 which extends over the outer edge of the back plate, being guided in an arc-shaped plate 125 secured to the back plate. By moving the lever 124 the shoes are expanded to bear against the inner surface of the brake drum and a very powerful braking action is obtained. The lever 124 is formed at its outer end with a reversely bent end or tail piece as shown in Figure 3, which projects within the outer circumference of the end plate 2 and is guided thereby. Within the curved portion of the lever is secured a filler piece 128 which affords a finger rest in the operation of the brake lever. This, in combination with the adjustable drag on the crank handle or separable therefrom, gives a very wide range of manipulation to the spool and renders it more efficient than previous reel constructions of this type. The inner or pivoted ends of the shoes are in rolling contact with one another throughout the entire movement so that they mutually support one another and relieve the strain upon the rivets.

The operation and advantages of the reel structure which have been shown and described will be readily noted by those familiar with this art. Changes and modifications may be made in details of the construction without departure from the invention as set forth in the claims.

What is claimed is:—

1. In a fishing reel, a reel housing, a spool therein, means for driving the spool, and a brake mechanism for the spool comprising a brake drum attached to the spool, a pair of brake shoes movable upon the reel housing, yielding means for moving the brake shoe away from the drum, and a lever actuated cam button journaled off center the reel housing for moving the brake shoes toward the drum.

2. In a fishing reel, a reel end plate, a spool in the reel, means for driving the spool, a brake drum having a flange thereon attached to the spool, a pair of pivoted arc-shaped brake shoes mounted on the end plate and lying within the flange, and means for rocking the shoes about their pivots comprising a lever on the back plate and a rotatable button located off center of the spool between the free ends of the brake shoes and connected to the lever.

3. In a fishing reel, a reel end plate, a spool in the reel, a brake drum having a flange thereon attached to the spool, braking means mounted on the end plate and operable against the inner surface of the flange, the outer surface of the flange being formed with teeth, and a click pawl engageable with the teeth.

4. In a fishing reel, a reel end plate, a spool in the reel, a brake drum having a flange thereon attached to the spool, braking means mounted on the end plate and operable against the inner surface of the flange, means actuated from the exterior of the reel for controlling the action of the braking means, the outer surface of the flange being formed with teeth, and a click pawl engageable with the teeth.

5. In a fishing reel, the combination of a spool, adjustable brake mechanism for the spool, the force of which is controlled exteriorly of the reel and an adjustable click mechanism comprising a ratchet integral with a brake drum.

6. In a fishing reel, a driving gear therefor, a shaft supporting said gear, an integral crank keyed upon the shaft, a nut to secure the crank in position upon the shaft, the crank being recessed to receive the nut so that its outer surface is substantially flush with the crank, and releasable means for locking the nut to the shaft.

7. In a fishing reel, a driving gear therefor, a shaft for said gear, an integral crank arm keyed directly upon the shaft, a nut to secure the crank arm in position upon the shaft, the crank being recessed to receive the nut so that its outer surface is substantially flush with the crank, and means to secure the nut comprising a pawl on the crank and teeth upon the nut with which the pawl is engaged.

8. In a fishing reel, a driving gear therefor, a shaft supporting said gear, an integral crank keyed upon the shaft, a nut to secure the crank in position on the shaft, the periphery of the nut being provided with teeth, and a pawl located on the under side of the crank and projecting through the body of the crank to engage the teeth.

9. In a fishing reel, a front plate comprising a composition body and a metal backing plate on the inner face thereof, a spool having a shaft projecting therefrom, a bushing located in a recess in the front plate, the shaft being received in the bushing, and a flange formed on the bushing and secured to the backing plate exteriorly of said recess.

10. In a fishing reel, a front plate comprising a composition body and a metal backing plate on the inner face thereof, a spool having a shaft projecting therefrom, a bushing seated in a recess in the front plate, a pinion upon the shaft, a rim upon the bushing extending substantially around the pinion, and a flange upon the rim secured to the backing plate.

11. In a fishing reel, a spool, an end plate comprising a composition face member and a metal member closely backing and supporting said face member, the backing member being recessed only where necessary for the accommodation of the spool operating mechanism, and a separate thin flanged facing ring attached to the end plate, the thin inner edge of the facing ring fitting closely about the spool flange.

12. A fishing reel having an end plate, a lever pivoted in the end plate and extending beyond the periphery thereof, a return bent extremity on the lever which extends within the outer periphery of the end plate, and a filler piece within the curved portion of the lever, said filler piece affording a finger rest.

CHARLES T. PFLUEGER.
WALTER L. ADAMS.